United States Patent [19]

Gaul et al.

[11] 4,344,798
[45] Aug. 17, 1982

[54] ORGANIC POLYISOCYANATE-DIALKYL CARBONATE ADHESIVE BINDER COMPOSITIONS

[75] Inventors: James M. Gaul, Exton; Tinh Nguyen, Chaddsford, both of Pa.

[73] Assignee: Atlantic Richfield Company, Los Angeles, Calif.

[21] Appl. No.: 293,563

[22] Filed: Aug. 17, 1981

[51] Int. Cl.$^3$ ............................................. C08L 97/02
[52] U.S. Cl. ........................... 106/123 LC; 156/326; 106/163 R; 106/203; 524/702; 524/703; 524/729
[58] Field of Search ................ 156/326; 106/123 LC, 106/163, 203; 527/103, 301, 401; 252/182

[56] References Cited

U.S. PATENT DOCUMENTS

| | | | |
|---|---|---|---|
| 3,519,581 | 7/1970 | Moorer et al. | 260/17.5 |
| 3,577,358 | 5/1971 | Santelli et al. | 260/2.5 |
| 4,032,483 | 6/1977 | Hartman | 260/2.5 AM |

*Primary Examiner*—Earl A. Nielsen
*Attorney, Agent, or Firm*—Delbert E. McCaslin

[57] ABSTRACT

An adhesive binder composition is provided for the preparation of lignocellulosic composite molded articles such as flake or particle board, made from moldable compositions which comprises an organic di- or polyisocyanate and a liquid dialkyl ester of carbonic acid and optionally lignin, for application to the lignocellulosic material prior to the molding process to form the composite product.

28 Claims, No Drawings

ORGANIC POLYISOCYANATE-DIALKYL CARBONATE ADHESIVE BINDER COMPOSITIONS

FIELD OF THE INVENTION

The present invention relates generally to the compression molding of lignocellulosic materials into composite bodies, sheets and the like and more particularly to an organic di- or polyisocyanate based binder system for the lignocellulosic material which imparts equivalent or improved properties to the molded pressed composite product at substantially reduced isocyanate binder levels.

BACKGROUND OF THE INVENTION

The molding of lignocellulosic and lignocellulosic-containing fibers, particles or layers to form composite articles is known. The binders which normally are used are the synthetic resin glues such as a solution of urea-formaldehyde or phenol-formaldehyde resin in water. Composite products containing lignocellulose produced in this way lack durability and are susceptible to moisture conditions and deterioration in certain building purposes to which they may be subjected.

Di- and polyisocyanates as binders for lignocellulose materials have been proposed and are known to give products of increased stability and mechanical strength. Process technical advantages of polyisocyanates have been disclosed in German Offenlegungsschrift No. 2,109,686. Two problems associated with the use of polyisocyanate binders are (1) even at reduced binder use levels, the cost of the polyisocyanates as compared to the ureaformaldehyde or phenol-formaldehyde resin binders is unfavorable and (2) the viscosity of the normally employed polyisocyanate binders are much higher than the synthetic glue resins and are therefore difficult to apply to the lignocellulose with current application equipment or methods. The advent of technology to emulsify the polyisocyanates in water provided a binder product with reduced viscosity but with a service life of only 2 to 4 hours.

The present invention which comprises an improved polyisocyanate based adhesive binder composition that has been extended through the addition of a liquid dialkyl esters of carbonic acid and optionally lignin, avoids the above mentioned disadvantages.

SUMMARY OF THE INVENTION

This invention relates to the preparation of a polyisocyanate-liquid dialkyl carbonate binder composition and its use for the preparation of lignocellulosic composite molded products.

It is the principal object of this invention to provide an improved lignocellulosic binder and composition which gives properties equivalent to or better than prior molded pressed composite products at dramatically reduced di- or poly-isocyanate (referred to generally as polyisocyanates) levels and cost.

The advantages of the present invention is that the levels of the di- or poly-isocyanate necessary to produce a cured pressed composite lignocellulosic product can be substantially reduced while maintaining equivalent or superior composite board physical properties. By employing the di- or polyisocyanate-dialkyl carbonate combination, with or without the use of lignin as a diluent, the binder resin economics are equivalent or better than the synthetic glue resin economics. The composite products made with the adhesive binders of the present invention have superior physical properties to those prepared with the urea-formaldehyde or phenol-formaldehyde binder systems. The addition of the liquid dialkyl carbonates (dialkyl esters of carbonic acid) to the di- or polyisocyanates reduces the overall viscosity of the binder system while exhibiting a marked increase in service life of up to thirty (30) days. The binder system of the present invention has viscosities equivalent to or lower than the formaldehyde type resin systems in water, which allows the instant binder system to be applied to the lignocellulosic chips, particles, etc., using present application technology. As a further advantage, the binder system of the present invention can be employed with high molecular weight solid or semisolid di- or polyisocyanates which by themselves would have properties which would preclude their use as adhesives for lignocellulosic products with current application techniques.

DESCRIPTION OF THE INVENTION

In accordance with the present invention an adhesive binder composition comprising a dialkyl carbonate having from 3 to 11 carbon atoms or mixtures thereof and an organic di- or polyisocyanate, with or without the addition of lignin, is provided for the preparation of lignocellulosic composite bodies or sheets which comprises shaping in a mold or between mold surfaces in the form of a caul plate or platen a mixture of the lignocellulosic material and the isocyanate based binder of the present invention generally at temperatures of from about 140° C. to 220° C., preferably 160° C. to 190° C., at pressures of from about 100 to 600 psi for a period of from 1 to 10 preferably 3 to 5 minutes, there being provided at the interface of the mixture and mold surface or surfaces a release agent such as a metallic soap.

The organic polyisocyanates are generally applicable as binders in the present invention. Organic polyisocyanates which may be used include aliphatic, alicyclic and aromatic polyisocyanates characterized by containing two or more isocyanate groups. Such polyisocyanates include the diisocyanates and higher functionality isocyanate, particularly the aromatic polyisocyanates. Mixtures of polyisocyanates may be used which for example are the crude mixtures of di- and higher functionality polyisocyanates produced by phosgenation of aniline-formaldehyde condensates or as prepared by the thermal decomposition of the corresponding carbamates dissolved in a suitable solvent as described in U.S. Pat. Nos. 3,962,302 and 3,919,279 both known as crude MDI or PMDI. The organic polyisocyanate may be isocyanate-ended prepolymers made by reacting under standard known conditions, an excess of a polyisocyanate with a polyol which on a polyisocyanate to polyol basis may range from about 20:1 to 2:1 and include for example polyethylene glycol, polypropylene glycol, diethylene glycol monobutyl ether, ethylene glycol monoethyl ether, triethylene glycol, etc. as well as glycols or polyglycols partially esterfied with carboxylic acids including polyester polyols and polyether polyols. The organic polyisocyanates or isocyanate terminated prepolymer may also be used in the form of an aqueous emulsion by mixing such materials with water in the presence of an emulsifying agent. The isocyanates may also contain impurities or additives such as carbodiimides, isocyanurate groups, urea, hydrolyzable chlorides and biurets as well as certain release agents. Illustrative of such di- or polyisocyanates which may be employed include, for example, toluene-2,4- and 2,6-diisocyanates or mixtures thereof, diphenylmethane-4,4'-diisocyanate (a solid) and diphenylmethane-2,4'-diisocyanate (a solid) or mixtures of same, i.e., containing about 10 parts by weight 2,4'- or higher, which are liquid at room temperature, polymethylene polyphenyl isocyanates, naphthalene-1,5-diisocyanate, 3,3'-dimethyl diphenylmethane4,4'-diisocyanate, triphenylmethane triisocyanate, hexamethylene diisocyanate, 3,3'-ditolylene-4,4-diisocyanate, butylene 1,4-diisocyanate, octylene-1,8-diisocyanate, 4-chloro-1,3-phenylene diisocyanate, 1,4- 1,3- and 1,2-cyclohexylene diisocyanates and in general the polyisocyanates disclosed in U.S. Pat. No. 3,577,358. The preferred polyisocyanates are the diphenylmethane diisocyanate 2,4'and 4,4'isomers including the 2,2'isomer and the higher functional polyisocanate and polymethylene polyphenyl isocyanate mixtures, which may contain from about 20 to 85 weight percent of the diphenylmethane diisocyanate isomers. Typical of the preferred polyisocyanates are those sold commercially as "Rubinate-M" (Rubicon Chemicals Inc.) and "Papi" (Yhe Upjohn Co.). In general the organic polyisocyanates will have a molecular weight in the range between about 100 and 10,000 and will be employed in amounts of from about 20 to 95 parts by weight, preferably 50 to 75 parts by weight based on the polyisocyanatecarbonate mixture.

The liquid dialkyl esters of carbonic acid (dialkyl carbonates) or mixtures thereof employed in the present invention in amounts of from about 5 to 80 preferably 50 to 25 parts by weight based on the isocyanate-carbonate binder mixture contain from 3 to 11 carbon atoms and include, for example dimethyl, diethyl, di-n-propyl, diisopropyl, di-n-butyl, diisobutyl and diisoamyl carbonates as well as methyl ethyl carbonate, diallyl carbonate, methyl-n-propyl carbonate, ethyl-n-butyl carbonate, ethyl isopropenyl carbonate, ethyl n-propyl carbonate, etc.

As indicated hereinabove the addition of the dialkyl carbonate reduces the overall viscosity of the binder system providing ease of application. Typical of the viscosities attained in centipoise, (c.p.) at 25° C. are as follows using a diphenylmethane diisocyanatepolymethylene polyphenyl isocyanate mixture, sold commercially as "Rubinate-M" by Rubicon Chemicals Inc. and having a viscosity of 230 c.p. at 25° C. Viscosities in centipoise was determimed after aging 1, 7, 12 and 28 days at various ratios by weight of polyisocyanate to dialkyl carbonate.

| 230 c.p. Isocyanate | | Centipoise After | | | |
|---|---|---|---|---|---|
| | | 1 day | 7 days | 12 days | 28 days |
| | Di-Methyl Carbonate | | | | |
| 3.0 | 0.5 | 16.2 | 16.2 | 16.8 | 17.1 |
| 2.5 | 1.0 | 4.9 | 4.9 | 5.2 | 6.1 |
| 2.0 | 1.5 | 1.4 | 1.5 | 1.8 | 1.9 |
| | Di-Ethyl Carbonate | | | | |
| 3.0 | 0.5 | 18.6 | 18.6 | 18.9 | 19.4 |
| 2.5 | 1.0 | 10.5 | 10.6 | 11.8 | 12.1 |
| 2.0 | 1.5 | 8.5 | 9.0 | 9.1 | 10.0 |
| | Di-Allyl Carbonate | | | | |
| 3.0 | 0.5 | 19.1 | 20.0 | 20.9 | 21.4 |
| 2.5 | 1.0 | 10.6 | 10.8 | 11.2 | 12.0 |
| 2.0 | 1.5 | 5.8 | 5.8 | 6.6 | 7.1 |

In addition a solid diphenylmethane-4,4'-diisocyanate was mixed with dimethyl carbonate at a parts by weight ratio of the 4,4'isomer to dimethyl carbonate of 2.5:1.0, 2.0:1.5 and 3.0:0.5 and gave a mixture with less than 60 c.p., a clear liquid mixture of 20 c.p. and a liquid mixture of less than 100 c.p. respectively.

The lignin which may be employed as a diluent in the binder system of the present invention are used in amounts of from 0 to 60 weight percent, preferably from 20 to 35 weight percent based on the total polyisocyanate-dialkyl carbonate-lignin mixture. The exact composition of lignin varies. Lignin derived from a variety of sources may be used in the binder system of the present invention to form the adhesive mixture. One source is a mixture of waste liquors resulting from the chemical pulping of lignocellulose. Suitable lignin which may be employed include, for example, purified pine wood lignin, kraft waste liquior, soda waste liquor, calcium, magnesium, sodium and ammonium base sulfite liquors, chlorinated waste liquors, etc. Lignins from hardwood and softwood sources may be used as well as lignins from acid-precipitated and alkali-reconstituted kraft liquors. The abundant and available chlorinated waste liquors derived from paper mill bleach may be used. The waste liquors may be used in their original conditions in the adhesive binder composition of the instant invention. The lignin may also have a wide range of pH and a solids content of from about 10 to 90 weight percent. When employed, the lignin is simply physically mixed with the isocyanate-carbonate adhesive when prepared or applied directly to the lignocellulosic material.

Lignocellulose, according to the present invention, used to prepare the lignocellulosic-containing composite articles include wood chips, wood fibers, shavings, sawdust, wood wool, cork, bark and the like products from the wood-working industry. Fibers, particles, etc. from other natural products which are lignocellulosic such as straw, flax residues, dried weeds and grasses, nut shells, hulls from cereal crops such as rice and oats and the like may be used. In addition, the lignocellulosic materials may be mixed with inorganic flakes or fibrous material such as glass fibers or wool, mica and asbestos as well as with rubber and plastic materials in particulate form. The lignocellulose may contain a moisture (water) contentof up to about 25 percent by weight but preferably contains between 4 and 12 percent by weight.

In manufacturing lignocellulosic composite products for the purpose of this invention, such as flakeboard for example, a small amount of the binder (with or without lignin) along with the lignocellulosic material is simply milled or mixed uniformly together. Generally the isocyanate-dialkylcarbonate binding agent (with or without lignin) is sprayed onto the material while it is being mixed or agitated in suitable and conventional equipment. Various type mixing equipment such as an intensive shear mixer may be employed. The binder use levels according to the present invention, based on the weight of oven dried (0% moisture content) lignocellulosic material is from about 1.5 to 12 preferably 2.5 to 6.5 weight percent. The lignocellulose-adhesive binder mixture is generally sprinkled or formed in the desired proportions onto a caul plate of aluminum or steel which serves to carry the "cake" into the press to give the desired thickness of product, the plates having been sprayed or coated with a release agent such as the metal soaps like the iron, calcium or zinc stearate compounds. Other conventional release agents such as sodium phenolate and certain tertiary amines may also be employed.

The following examples are provided to illustrate the invention in accordance with the principles of this invention but are not to be construed as limiting the invention in any way except as indicated by the appended claims.

In the Examples which follow, the test results set forth are expressed as ASTM D 1037 values and wherein

| | |
|---|---|
| M.C. | is Moisture Content (%) |
| I.B. | is Internal Bond (psi) |
| T.S. | is cold water (25° C.) thickness swell, 24 hr. immersion (%) |
| PMDI | is a mixture of liquid diphenylmethane diisocyanate-polymethylene polyphenyl isocyanate having a 46.5% diphenylmethane diisocyanate content |
| DMC | is dimethyl carbonate |
| DEC | is diethyl carbonate |
| DAC | is diallyl carbonate |
| DIBC | is diisobutyl carbonate |
| TDI | is toluene-2,4-diisocyanate |
| TPMI | is triphenylmethane triisocyanate |

EXAMPLE 1

580 g. of pine wood chips dried to a moisture content of 6 percent are placed in an open tumbler-mixer. During tumbling, 3.5 parts based on 100 parts by weight of the wood of an isocyanate based binding agent prepared by mixing 70 parts crude liquid diphenylmethane diisocyanate-polymethylene polyphenyl isocyanate (PMDI) mixture having 46.5 percent diphenylmethane diisocyanate content and 30 parts dimethyl carbonate are sprayed over the chips by an air pressurized system. Two caul plates 12 inches square are sprayed evenly with a zinc stearate external release agent. Using a former box, a 10.5 inch square "cake" of the chip-binder mixture is formed on the caul plate. The second caul plate is placed over the cake which is pressed to stops at a thickness of 13 mm at 190° C. for 4½ minutes after which the pressed cake is released from between the press plates and cut into specimens for physical testing. Test results of the composite board is 143 psi I.B. and a T.S of 19.3 percent.

EXAMPLES 2 to 5

The procedure of Example 1 is repeated exceptthat different levels of dimethyl carbonate are substituted with crude liquid diphenylmethane diisocyanate-polymethylene polyphpenyl isocyanate (PMDI) mixture having 46.5 percent diphenylmethane diisocyanate content while maintaining the total binder level constant at 3.5 percent based on 100 parts by weight of the wood.

TABLE I

| Ex. No. | PMDI (%) | DMC (%) | I.B. (psi) | T.S. (%) |
|---|---|---|---|---|
| 2 | 85 | 15 | 153 | 15 |
| 3 | 78 | 22 | 130 | 21 |
| 4 | 43 | 57 | 123 | 28 |
| 5 | 100 | 0 | 165 | 18 |

EXAMPLES 6 to 9

The procedure of Examples 1 to 5 is repeated except with the following changes. The total binder level is held constant at 4.5 percent based on 100 parts by weight of the wood. A third component, lignin, a product resulting from the chemical pulping of lignocellulose, is added to the binder mixture. The liquid diphenylmethane diisocyanate-polymethylene polyphenyl isocyanate (PMDI) mixture having a 46.5 percent diphenylmethane diisocyanate content and dimethyl carbonate content varies over the range specified in Table 2.

TABLE 2

| Ex. No. | PMDI (%) | Lignin (%) | DMC (%) | I.B. (psi) | T.S. (%) |
|---|---|---|---|---|---|
| 6 | 66.8 | 22.2 | 11.0 | 138 | 24 |
| 7 | 61.0 | 22.2 | 16.8 | 135 | 23 |
| 8 | 55.5 | 22.2 | 22.3 | 129 | 25 |
| 9 | 44.4 | 22.2 | 33.4 | 130 | 26 |

EXAMPLES 10 to 14

The procedure for Examples 1 to 9 are repeated except for the following changes: diethyl carbonate is substituted for dimethyl carbonate. The binder level for 10 to 13 is held constant at 3.5 percent based on 100 parts by weight of the wood. Example 14 includes 22 weight percent lignin with a 4.5 weight percent binder level. The liquid diphenylmethane diisocyanate-polymethylene polyphenyl isocyanate (PMDI) mixture having 46.5 percent diphenylmethane diisocyanate content and carbonate percentages are varied according to Table 3 below.

TABLE 3

| Ex. No. | PMDI (%) | DEC (%) | I.B. (psi) | T.S. (%) |
|---|---|---|---|---|
| 10 | 100.0 | — | 165 | 20 |
| 11 | 78.5 | 21.5 | 155 | 26 |
| 12 | 71.0 | 29.0 | 135 | 27 |
| 13 | 57.0 | 43.0 | 114 | 30 |
| 14 | 56.0 | 22.0 | 118 | 27 |

EXAMPLE 15 (COMPARATIVE)

The procedure for Examples 1 to 14 are repeated except phenol formaldehyde resin (6 percent) is used as the binder and the pressing time is 9 minutes and pressing temperature 220° C. The following are the test results which indicate that a wax must be added to the material pressed to give desired properties.

| I.B. (psi) | T.S. (%) |
|---|---|
| 101 | 32.3 |

EXAMPLES 16 to 25

A number of runs are made in accordance with the procedure of Examples 1 to 5, utilizing various dialkyl carbonates and isocyanate compositions. The binding agent was prepared by mixing 70 parts isocyanate and 30 parts carbonate. The binder level is maintained at 3.5 weight percent based on 100 parts by weight of the wood. Example 25 is a mixture of 15 parts DEC and 15 parts by weight of DAC. The carbonate and isocyanates with test results are set forth in Table 4.

TABLE 4

| Ex. No. | Dialkyl Carbonate | Poly-Iso-cyanate | I.B. (psi) | T.S. (%) |
| --- | --- | --- | --- | --- |
| 16 | DMC | PMDI | 148 | 20.3 |
| 17 | DMC | TDI | 128 | 25.2 |
| 18 | DEC | TDI | 126 | 25.0 |
| 19 | DEC | TPMI | 139 | 22.3 |
| 20 | DAC | PMDI | 140 | 20.5 |
| 21 | DAC | TPMI | 136 | 23.5 |
| 22 | DIBC | TDI | 118 | 24.0 |
| 23 | DIBC | TPMI | 132 | 21.6 |
| 24 | DAC | TDI | 135 | 21.9 |
| 25 | DEC & DAC | PMDI | 150 | 21.0 |

We claim:

1. An adhesive binder composition for the preparation of compression moldable lignocellulosic articles which comprises from about 20 to 95 percent by weight of an organic di- or polyisocyanate and from about 5 to 80 percent by weight of a liquid dialkyl carbonate having from 3 to 11 carbon atoms.

2. The adhesive composition of claim 1 wherein from 0 to 60 weight percent lignin based on the total composition is added as diluent.

3. The adhesive composition of claim 2 wherein between 20 and 35 weight percent lignin is added as diluent.

4. The adhesive composition of claim 1 wherein the dialkyl carbonate is selected from the group consisting of dimethyl carbonate, diethyl carbonate, diallyl carbonate and diisobutyl carbonate.

5. The adhesive composition of claim 4 wherein the dialkyl carbonate is dimethyl carbonate.

6. The adhesive composition of claim 4 wherein the dialkyl carbonate is diethyl carbonate.

7. The adhesive composition of claim 4 wherein the dialkyl carbonate is diallyl carbonate.

8. The adhesive composition of claim 1 wherein the di- or polyisocyanate is a diphenylmethane diisocyanate.

9. The adhesive composition of claim 1 wherein the di- or polyisocyanate is a mixture of diphenylmethane diisocyanate and the higher functionality polymethylene polyphenyl isocyanates.

10. The adhesive composition of claim 1 wherein from 50 to 75 weight percent organic di- or polyisocyanate and from 50 to 25 weight percent dialkyl carbonate is employed.

11. A compression moldable lignocellulosic composition comprising lignocellulosic particles and from about 1.5 to 12 percent by weight based on oven dried particles of an adhesive binder composition which comprises from about 20 to 95 weight percent organic di- or polyisocyanate and from about 5 to 80 weight percent liquid dialkyl carbonate having from 3 to 11 carbon atoms.

12. The compression moldable composition of claim 11 wherein 2.5 to 6.5 weight percent adhesive binder is employed in the composition.

13. The compresson moldable composition of claim 11 wherein from 0 to 60 weight percent lignin based on the total adhesive binder composition is added as diluent.

14. The compression moldable composition of claim 13 wherein the lignin is between 20 and 35 weight percent.

15. The compression moldable composition of claim 11 wherein the dialkyl carbonate is selected from the group consisting of dimethyl carbonate, diethyl carbonate, diallyl carbonate and diisobutyl carbonate.

16. The compression moldable composition of claim 15 wherein the dialkyl carbonate is dimethyl carbonate.

17. The compression moldable composition of claim 15 wherein the dialkyl carbonate is diethyl carbonate.

18. The compression moldable composition of claim 15 wherein the dialkyl carbonate is diallyl carbonate.

19. The compression moldable composition of claim 11 wherein from 50 to 75 weight percent organic di-or polyisocyanate and from 50 to 25 weight percent liwquid dialkyl carbonate is employed in the adhesive binder.

20. The compression moldable composition of claim 11 wherein the di- or polyisocyanate is a diphenylmethane diisocyanate.

21. The compression moldable composition of claim 11 wherein the di- or polyisocyanate is a mixture of diphenylmethane diisocyanate and the higher functionality polymethylene polyphenyl isocyanates.

22. A composition board product comprising a compression molded lignocellulosic composition comprising lignocellulosic particles and from about 1.5 to 12 weight percent based on oven dried lignocellulosic particles employed of an adhesive binder composition, said binder composition being a mixture of from about 20 to 95 weight percent organic di- or polyisocyanate and from 5 to 80 weight percent liquid dialkyl carbonate having from 3 to 11 carbon atoms.

23. The composition board product of claim 22 wherein from 0 to 60 weight percent lignin based on the total adhesive binder composition is added as diluent.

24. The board product of claim 22 wherein the compression molded lignocellulosic composition is wood particle board.

25. A method for the preparation of lignocellulosic composite articles comprising the steps of
   (a) mixing together lignocellulosic particles and from about 1.5 to 12 weight percent based on oven dried lignocellulosic particles of an adhesive binder composition comprising from 20 to 95 weight percent organic di-and polyisocyanate and from about 5 to 80 weight percent liquid dialkyl carbonate having from 3 to 11 carbon atoms to form a moldable composition;
   (b) introducing said moldable composition onto a metal mold, caul plate or platen which has been sprayed or coated with a release agent;
   (c) compression shaping said composition at temperatures of between about 140° C. to 220° C. at pressures of from about 100 to 600 psi for a period of from 1 to 10 minutes to form a composite article of desired shape and/or thickness; and
   (d) thereafter releasing said lignocellulosic composite article from said metal mold, caul plate or platen.

26. A method according to claim 25 wherein 2.5 to 6.5 weight percent adhesive binder composition is employed and comprises from 50 to 75 weight percent organic di-or polyisocyanates and from 50 to 25 weight percent carbonate, the release agent is a metallic soap, the compression temperature is between 160° C. to 190° C. and the time period is from 3 to 5 minutes.

27. A method according to claim 25 wherein the binder composition is a mixture of diphenylmethane diisocyanate and the higher functionality polymethylene polyphenyl isocyanates and diethyl carbonate.

28. A method according to claim 25 wherein the compression molded lignocellulosic composition is wood particle board.